(12) United States Patent
Nishiki

(10) Patent No.: US 6,665,470 B2
(45) Date of Patent: Dec. 16, 2003

(54) OPTICAL FILTER

(75) Inventor: Akihiko Nishiki, Tokyo (JP)

(73) Assignee: Oki Electric Industry Co., Ltd., Toyko (JP)

( * ) Notice: Subject to any disclaimer, the term of this patent is extended or adjusted under 35 U.S.C. 154(b) by 192 days.

(21) Appl. No.: 09/833,661

(22) Filed: Apr. 13, 2001

(65) Prior Publication Data

US 2002/0025112 A1 Feb. 28, 2002

(30) Foreign Application Priority Data

May 17, 2000 (JP) .................................. 2000-144707

(51) Int. Cl.$^7$ ................................................ G02B 6/34
(52) U.S. Cl. .............................................. 385/37; 385/10
(58) Field of Search ................................ 385/10, 37, 27

(56) References Cited

U.S. PATENT DOCUMENTS

| | | | | |
|---|---|---|---|---|
| 5,572,357 A | * | 11/1996 | Nakazato et al. | 359/341.33 |
| 5,825,520 A | * | 10/1998 | Huber | 359/130 |
| 5,909,295 A | * | 6/1999 | Li et al. | 359/130 |
| 6,115,156 A | * | 9/2000 | Otani et al. | 359/124 |
| 6,144,784 A | * | 11/2000 | Shigehara et al. | 385/24 |
| 6,192,058 B1 | * | 2/2001 | Abeles | 372/6 |
| 6,201,907 B1 | * | 3/2001 | Farries | 385/24 |
| 6,281,998 B1 | * | 8/2001 | Jones et al. | 359/130 |
| 6,292,603 B1 | * | 9/2001 | Mizuochi et al. | 385/24 |
| 6,348,984 B1 | * | 2/2002 | Mizrahi | 359/124 |
| 6,363,184 B2 | * | 3/2002 | Cao | 385/24 |
| 6,381,069 B1 | * | 4/2002 | Riant et al. | 359/569 |
| 6,449,072 B1 | * | 9/2002 | Sian et al. | 359/127 |
| 6,483,618 B2 | * | 11/2002 | Amin et al. | 359/127 |

* cited by examiner

Primary Examiner—Frank G. Font
Assistant Examiner—Kevin Kianni

(57) ABSTRACT

An optical filter comprising a first CBG including a first end and a second end, a second CBG of the same structure as the first CBG, including a third end of the same structure as the first end and a fourth end of the same structure as the second end, and a circuit including an input port and an output port. The circuit receives a first optical signal via the input port and brings it to the first end of the first CBG, the circuit receives a second optical signal produced by reflecting the first optical signal from the first CBG and brings the second optical signal to the fourth end of the second CBG, and the circuit receives a third optical signal produced by reflecting the second optical signal from the second CBG and outputs the third optical signal via the output port.

8 Claims, 6 Drawing Sheets

OPTICAL FILTER

BACKGROUND OF THE INVENTION

The present invention relates to an optical filter such as an optical demultiplexing filter, an optical multiplexing filter, and an optical add/drop filter, and, in particular, relates to an optical filter with a function of suppressing dispersion.

FIG. 8 shows a schematic view of a prior-art optical demultiplexing filter. The optical demultiplexing filter shown in FIG. 8 comprises a chirped Bragg grating (CBG) 31 coupled to a three-port optical circulator 32. A wavelength division multiplexed (WDM) optical signal (wavelengths $\lambda_1, \ldots, \lambda_n$) input to a first port P1 of the optical circulator 32 passes through a second port P2 to be input to a short wavelength end 31S (or a long wavelength end 31L) of the CBG 31. Only a wavelength component of the WDM optical signal having a wavelength $\lambda_m$ ($1 \leq m \leq n$) which corresponds to the grating pitch of the CBG 31 is reflected, while the other wavelength components of the WDM optical signal having wavelengths other than $\lambda_m$ pass through the CBG 31 to be absorbed by a termination 33 and terminate optically. The reflected wavelength component (that is, the optical signal of the wavelength $\lambda_m$) is input to the second port P2 and is output via a third port P3 of the optical circulator 32. In this manner, the optical signal having the particular wavelength $\lambda_m$ can be extracted from the WDM optical signal. The CBG 31 which has a chirped structure providing a gradually changing Bragg grating pitch is used here in order to secure a certain width for the pass band (or reflection band) of the optical signal.

However, when the optical demultiplexing filter constructed in a manner illustrated in FIG. 8 is used with a transmission system having a transmission rate which is as high as up to 40 Gbits/s, there is a problem that an impermissible amount of dispersion occurs in the output optical signal. FIGS. 9A and 9B show a cause of the occurrence of dispersion. Specifically, the dispersion is caused by the fact that the carrier frequency and the sidebands including upper and lower sidebands (USB and LSB) in the input optical signal as shown in FIG. 9A are reflected from different lengthwise positions in the CBG 31, as illustrated in FIG. 9B.

SUMMARY OF THE INVENTION

It is an object of the present invention to provide an optical filter that is capable of processing an optical signal while suppressing the occurrence of dispersion in the optical signal.

According to the present invention, an optical filter comprises a first chirped Bragg grating including a first input/output end and a second input/output end; a second CBG of the same structure as the first CBG, including a third input/output end of the same structure as the first input/output end of the first CBG and a fourth input/output end of the same structure as the second input/output end of the first CBG; and a circuit including an input port and an output port. The circuit receives a first optical signal via the input port and brings the first optical signal to the first input/output end of the first CBG. The circuit receives a second optical signal which is produced by reflecting at least one wavelength component of the first optical signal from the first CBG and brings the second optical signal to the fourth input/output end of the second CBG. The circuit receives a third optical signal which is produced by reflecting the second optical signal from the second CBG and outputs the third optical signal via the output port.

The optical filter may further comprise a termination coupled to the second input/output end of the first CBG, which does not reflect any optical signal; and a port coupled to the third input/output end of the second CBG, to which a fourth optical signal is input; wherein the circuit outputs a multiplexed optical signal including the third optical signal and the fourth optical signal via the output port.

According to another aspect of the present invention, an optical filter comprises a first CBG including a first input/output end and a second input/output end; a second CBG of the same structure as the first CBG, including a third input/output end of the same structure as the first input/output end of the first CBG and a fourth input/output end of the same structure as the second input/output end of the first CBG; a first circuit including a first input port and a first output port, wherein the first circuit receives a first optical signal via the first input port and brings the first optical signal to the first input/output end of the first CBG, the first circuit receives a second optical signal which is produced by reflecting at least one wavelength component of the first optical signal from the first CBG and brings the second optical signal to the fourth input/output end of the second CBG, and the first circuit receives a third optical signal which is produced by reflecting the second optical signal from the second CBG and outputs the third optical signal via the first output port; and a second circuit including a second input port and a second output port, wherein the second circuit receives a fourth optical signal via the second input port and brings the fourth optical signal to the third input/output end of the second CBG, the second circuit receives a fifth optical signal which is produced by reflecting the fourth optical signal from the second CBG and brings the fifth optical signal to the second input/output end of the first CBG, and the second circuit receives a sixth optical signal which is produced by reflecting the fifth optical signal from the first CBG and outputs the sixth optical signal via the second output port. The second circuit outputs the first optical signal, from which the second optical signal is removed and which has passed through the first CBG, via the second output port together with the sixth optical signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
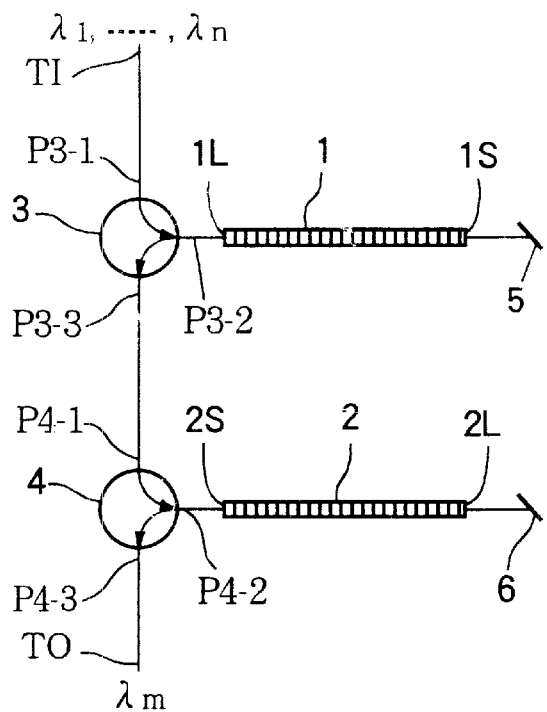
FIG. 1 is a schematic view of an optical demultiplexing filter according to a first embodiment of the present invention.

FIG. 1 is a schematic view of an optical demultiplexing filter according to a first embodiment of the present invention. As shown in FIG. 1, the optical demultiplexing filter according to the first embodiment comprises a CBG 1 and a CBG 2, which have substantially the same structure and substantially the same reflection spectrums. The optical demultiplexing filter also comprises a pair of three-port optical circulators 3 and 4.

The CBG 1 is structured so that the pitch of the Bragg grating changes along the lengthwise position at a given rate (a chirp rate of 0.15 nm/cm, for example). The CBG 1 thus has a long wavelength end 1L and a short wavelength end 1S. As the lengthwise position approaches the long wavelength end 1L, a wavelength of the reflected light becomes longer, while as the lengthwise position approaches the short wavelength end 1S, a wavelength of the reflected light becomes shorter. The CBG 2 includes a long wavelength end 2L and a short wavelength end 2S. Purpose of using the CBG 1 and the CBG 2 having a chirped structure is to secure a certain width for the pass band (or reflection band) of the input optical signal.

The optical circulator 3 has a first port P3-1, which is coupled to an input port TI and to which an optical signal is input, a second port P3-2, from which the optical signal input to the first port P3-1 is output, and a third port P3-3, from which the optical signal input to the second port P3-2 is output. The optical circulator 4 has a first port P4-1, which is coupled to the third port P3-3 of the optical circulator 3 and to which an optical signal is input, a second port P4-2, from which the optical signal input to the first port P4-1 is output, and a third port P4-3, from which the optical signal input to the second port P4-2 is output. The second port P3-2 of the optical circulator 3 is coupled to the long wavelength end 1L of the CBG 1, while the second port P4-2 of the optical circulator 4 is coupled to the short wavelength end 2S of the CBG 2.

A termination 5 is coupled to the short wavelength end 1S of the CBG 1 to terminate the input optical signal by absorption without causing any reflection thereof. A termination 6 is coupled to the long wavelength end 2L of the CBG 2 to terminate the input optical signal by absorption without causing any reflection thereof.

In the arrangement described above, a WDM optical signal (wavelengths $\lambda_1, \ldots, \lambda_n$) is input via the input port TI to the first port P3-1 of the optical circulator 3. Wavelength components of the WDM optical signal may be arranged in the manner of an optical frequency grid with a spacing corresponding to 50 GHz, 100 GHz or 200 GHz, for example. The input WDM optical signal is brought via the second port P3-2 of the optical circulator 3 to the long wavelength end 1L of the CBG 1. The CBG 1 reflects a wavelength component in a band corresponding to the reflection spectrum of the CBG 1 (that is, an optical signal having a wavelength $\lambda_m$, where m is a positive integer not greater than a positive integer n, or more strictly, an optical signal contained in a band of a certain bandwidth centered about the wavelength $\lambda_m$) from among the input WDM optical signal. The wavelength components of the WDM optical signal having wavelengths other than the wavelength $\lambda_m$ pass through the CBG 1 to be input to the termination 5 where they terminate optically. The optical signal of the wavelength $\lambda_m$ which is reflected by the CBG 1 is then input to the second port P3-2 of the optical circulator 3 and output from the third port P3-3 thereof.

The optical signal of the wavelength $\lambda_m$ which is output from the third port P3-3 of the optical circulator 3 is input to the first port P4-1 of the optical circulator 4 and is then output from the second port P4-2 to be input to the short wavelength end 2S of the CBG 2, which reflects only the optical signal of the wavelength $\lambda_m$. The wavelength components of the WDM optical signal other than the wavelength $\lambda_m$ pass through the CBG 2 to be input to the termination 6 where they terminate optically. The optical signal of the wavelength $\lambda_m$ which is reflected by the CBG 2 is input to the second port P4-2 of the optical circulator 4 and is then output form the third port P4-3 thereof.

Figure 2:
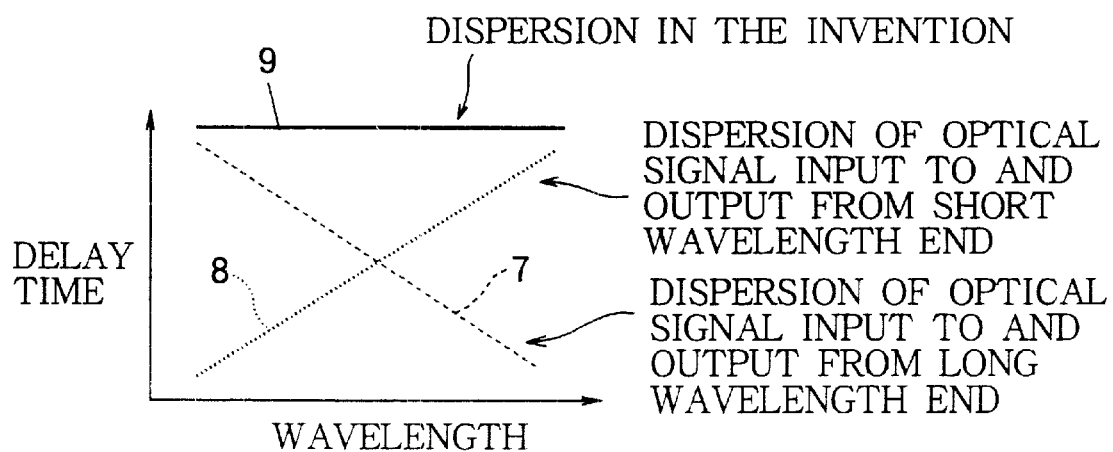
FIG. 2 is an illustration for indicating dispersion characteristics of the optical demultiplexing filter according to the first embodiment.
Figure 9A:
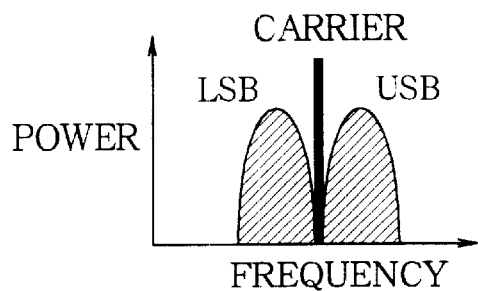
FIGS. 9A and 9B are illustrations of the cause for the occurrence of dispersion in the prior-art optical demultiplexing filter.
Figure 9B:
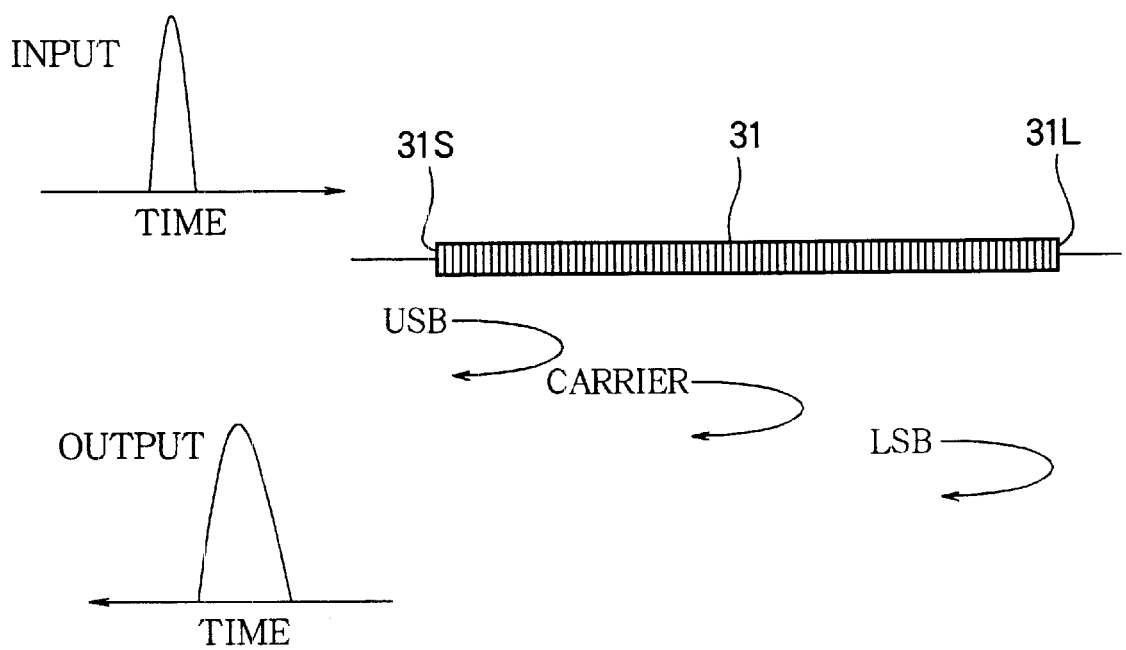

As shown by a waveform diagram shown in the lower left portion of FIG. 9B, there is the dispersion, which is attributable to the chirped structure of the CBG 1, in the optical signal of the wavelength $80_m$ which is reflected by the CBG 1. However, in the present embodiment, the optical signal which is input to the long wavelength end 1L of the CBG 1 and output from the same long wavelength end 1L the CBG 1 is input to the short wavelength end 2S of the CBG 2 and output from the same short wavelength end 2S of the CBG 2, which has substantially the same structure and substantially the same reflection spectrum as the CBG 1. Accordingly, the dispersion (as indicated by a broken line 7 in FIG. 2) which occurs in the optical signal immediately after it is output from the long wavelength end 1L of the CBG 1 is cancelled by the dispersion (indicated by a broken line 8 in FIG. 2) in the optical signal which results from providing it to an input to the short wavelength end 2S of the CBG 2, thereby providing a signal indicated by a solid line 9 in FIG. 2 which is relatively free from dispersion. Thus, the optical demultiplexing filter having the above-mentioned structure can allow an optical signal of a desired wavelength to be extracted from among the WDM optical signal without any substantial dispersion in the optical signal.

Figure 3:
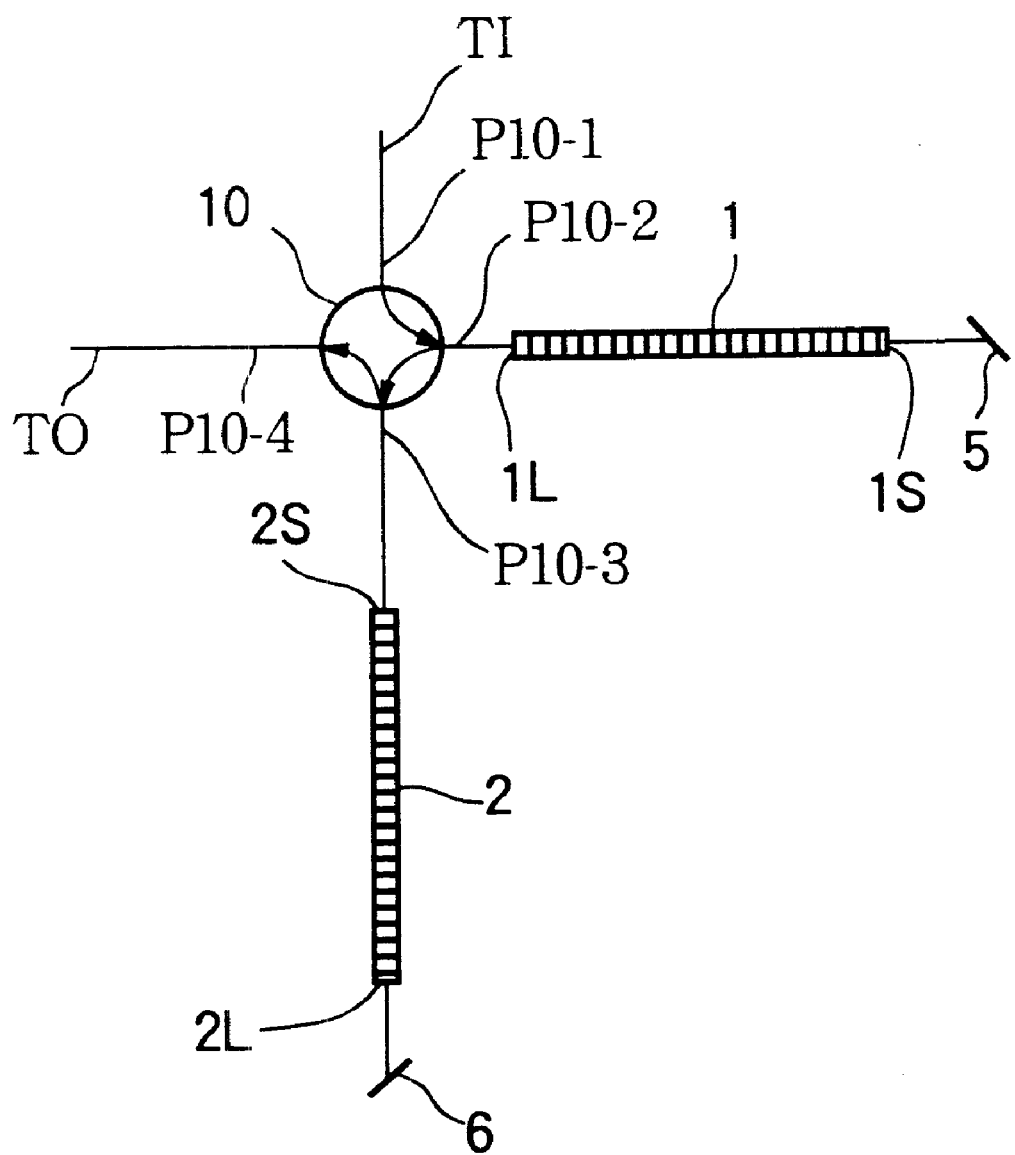
FIG. 3 is a schematic view of a modification of the optical demultiplexing filter according to the first embodiment.

In the above description, the arrangement includes the pair of three-port optical circulators 3 and 4. However, the pair of three-port optical circulators 3 and 4 can be replaced by a single four-port optical circulator 10, as shown in FIG. 3.

Further, in the above or below description, the CBG 1 and the CBG 2 may be disposed so that the long wavelength end 1L and the short wavelength end 1S of the CBG 1 are reversed and the long wavelength end 2L and the short wavelength end 2S of the CBG 2 are reversed. Furthermore, by using the CBGs 1 and 2 having a broad reflection band (broad enough to reflect input signals of two or more wavelengths), the optical demultiplexing filter can allow an optical signal of two or more wavelengths to be extracted from among the WDM optical signal without any substantial dispersion in the optical signal.

Second Embodiment

Figure 4:
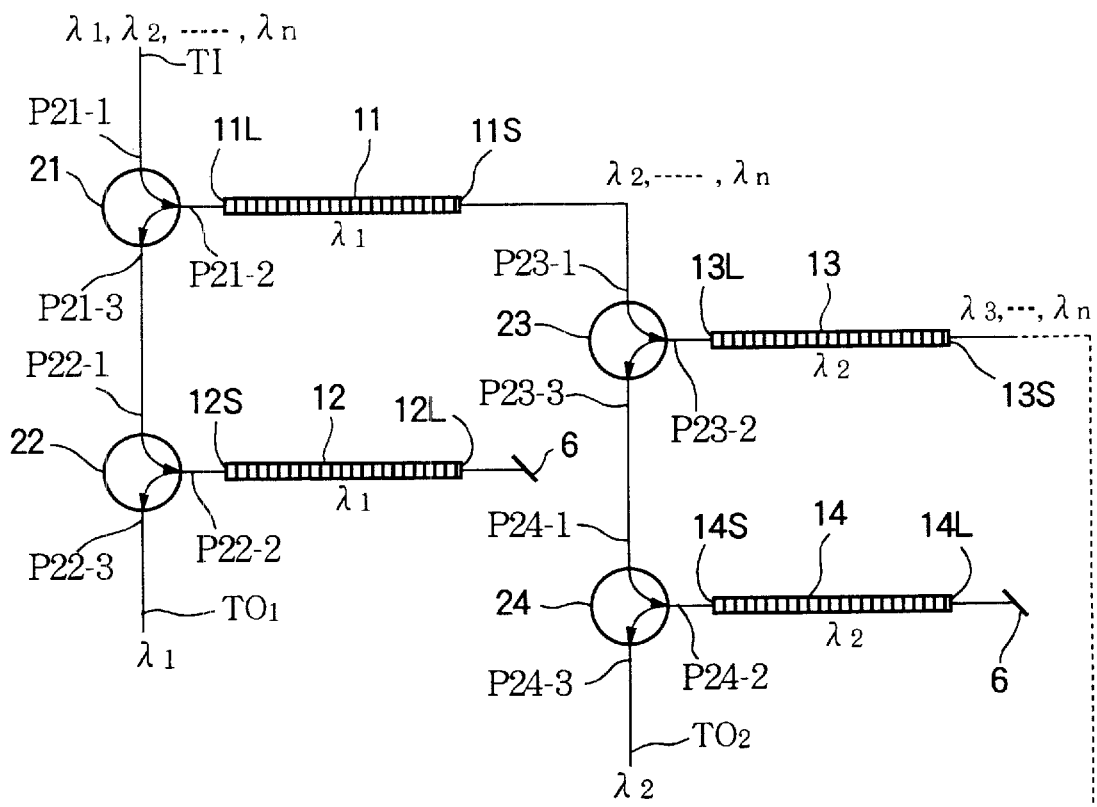
FIG. 4 is a schematic view of a multiple-wavelength optical demultiplexing filter according to a second embodiment of the present invention.
Figure 4:
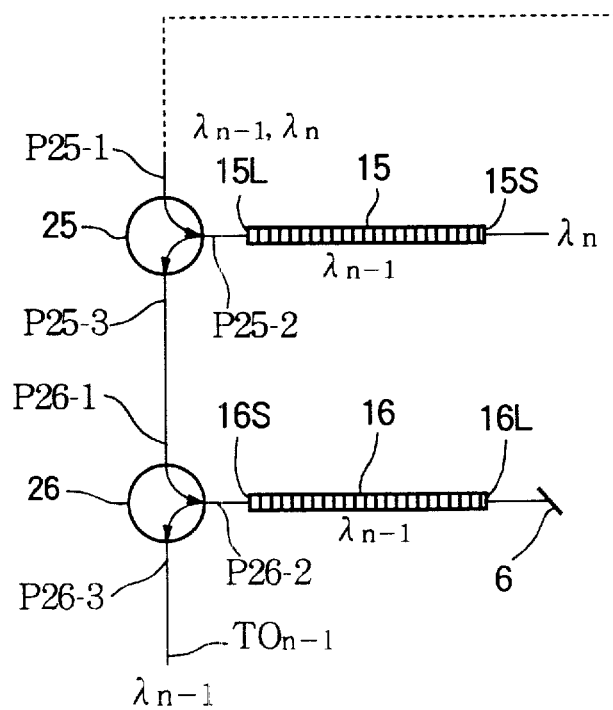

FIG. 4 is a schematic view of a multiple-wavelength optical demultiplexing filter according to a second embodiment of the present invention. As shown in FIG. 4, the multiple-wavelength optical demultiplexing filter of the second embodiment comprises a plurality of optical filters, each corresponding to the optical filter shown in FIG. 1, in cascade connection. FIG. 4 shows only three stages in cascade connection. The optical demultiplexing filter can divide wavelength components of every wavelength $\lambda_1$, $\lambda_2$, ..., $\lambda_n$ contained in the input WDM optical signal to output the wavelength components separately.

The multiple-wavelength optical demultiplexing filter according to the second embodiment comprises, for the first stage which is designed to output the optical signal of the wavelength $\lambda_1$ via an output port $TO_1$, a pair of CBG 11 and CBG 12 having substantially the same structure and substantially the same reflection spectrum (i.e., a reflection band containing the wavelength $\lambda_1$) and a pair of three-port optical circulators 21 and 22. The CBG 11 has a structure in which the pitch of the Bragg grating is varied at a given rate, which may be a chirp rate of 0.15 nm/cm, for example, and includes a long wavelength end 11L and a short wavelength end 11S. The CBG 12 includes a long wavelength end 12L and a short wavelength end 12S in the similar manner as the CBG 11.

The multiple-wavelength optical demultiplexing filter according to the second embodiment comprises, for the second stage which is designed to output the optical signal of the wavelength $\lambda_2$ via an output port $TO_2$, a pair of CBG 13 and CBG 14 having substantially the same structure and substantially the same reflection spectrum (i.e., a reflection band containing the wavelength $\lambda_2$), and a pair of three-port optical circulators 23 and 24. The CBG 13 has a structure in which the pitch of the Bragg grating is varied at a given rate, which may be a chirp rate of 0.15 nm/cm, for example, and has a long wavelength end 13L and a short wavelength end 13S. The CBG 14 has a long wavelength end 14L and a short wavelength end 14S in the similar manner as the CBG 13.

In addition, the multiple-wavelength optical demultiplexing filter according to the second embodiment also comprises a third and a subsequent stage which are constructed in the similar manner as the first and the second stage. Specifically, to provide an (n−1)-th stage which is designed to output an optical signal having a wavelength $\lambda_{n-1}$ via an output port $TO_{n-1}$, the multiple-wavelength optical demultiplexing filter according to the second embodiment comprises a pair of CBG 15 and CBG 16 having substantially the same structure and substantially the same reflection spectrum (i.e., a reflection band containing the wavelength $\lambda_{n-1}$), and a pair of three-port optical circulators 25 and 26. The CBG 15 has a structure in which the pitch of the Bragg grating is changed at a given rate, which may be a chirp rate of 0.15 nm/cm, and has a long wavelength end 15L and a short wavelength end 15S. The CBG 16 has a long wavelength end 16L and a short wavelength end 16S in the similar manner as the CBG 15.

In the described arrangement, when a WDM optical signal (wavelengths $\lambda_1$, ..., $\lambda_n$) is input to the first port P21-1 of the optical circulator 21, it is output from the second port P21-2 thereof and input to the long wavelength end 11L of the CBG 11, which then reflects only an optical signal having a wavelength $\lambda_1$ (i.e., in a band which corresponds to the reflection spectrum of the CBG 11 from among wavelength components of the input WDM optical signal), while transmitting the remaining wavelengths (wavelengths $\lambda_2$, ..., $\lambda_n$). The optical signal of the wavelength $\lambda_1$ which is reflected by the CBG 11 is input to the second port P21-2 of the optical circulator 21 and is output from the third port P21-3 thereof to be input to the short wavelength end 12S of the CBG 12 through the first port P22-1 and the second port P22-2 of the optical circulator 22. The CBG 12 reflects only the optical signal of the wavelength $\lambda_1$ and the optical signal components other than the wavelength $\lambda_1$, pass through the CBG 12 to be input to the termination 6 where they terminate optically. The optical signal of the wavelength $\lambda_1$ which is reflected by the CBG 12 is input to the second port P22-2 of the optical circulator 22 and is output from the third port P22-3 thereof. In this manner, the first stage can allow the optical signal of the wavelength $\lambda_1$ to be extracted with causing almost no dispersion therein.

The WDM optical signal (wavelengths $\lambda_2$, ..., $\lambda_n$) which has passed through the CBG 11 is input to the first port P23-1 of the optical circulator 23, and is output from the second port P23-2 thereof and input to the long wavelength end 13L of the CBG 13. The CBG 13 reflects only the optical signal having the wavelength $\lambda_2$ (i.e., in a band which corresponds to the reflection spectrum of the CBG 13 from among the input WDM optical signal) while allowing the remaining wavelength components (wavelengths $\lambda_3$, ..., $\lambda_n$) to transmit therethrough. The optical signal of the wavelength $\lambda_2$ which is reflected by the CBG 13 is input to the second port P23-2 of the optical circulator 23 and is output from the third port P23-3 thereof to be input to the short wavelength end 14S of the CBG 14 through the first port P24-1 and the second port P24-2 of the optical circulator 24. The CBG 14 reflects only the optical signal of the wavelengths $\lambda_2$ while the optical signal components other than the wavelength $\lambda_2$ pass through the CBG 14 to be input to a termination 6 where they terminate optically. The optical signal of the wavelength $\lambda_2$ which is reflected by the CBG 14 is input to the second port P24-2 of the optical circulator 24 and is output from the third port P24-3 thereof. In this manner, the second stage can allow the optical signal of the wavelength $\lambda_2$ to be extracted with causing almost no dispersion therein.

The third and the subsequent stages operate in a similar manner. Considering an (n−1)-th stage, for example, the WDM optical signal (wavelengths $\lambda_{n-1}$, $\lambda_n$) is input to the first port P25-1 of the optical circulator 25, and is output from the second port P25-2 thereof to be input to the long wavelength end 15L of the CBG 15. The CBG 15 reflects only the optical signal having a wavelength $\lambda_{n-1}$ (i.e., in a band which corresponds to the reflection spectrum of the CBG 15) while allowing the optical signal or the remaining wavelength $\lambda_n$ to pass therethrough. The optical signal of the wavelength $\lambda_{n-1}$ which is reflected by the CBG 15 is input to the second port P25-2 of the optical circulator 25 and is output from the third port P25-3 thereof to be input to the short wavelength end 16S of the CBG 16 through the first port P26-1 and the second port P26-2 of the optical circulator 26. The CBG 16 reflects only the optical signal of the wavelength $\lambda_{n-1}$, and any other optical signal having a wavelength other than $\lambda_{n-1}$ transmit through the CBG 16 to be input to the termination 6 where it terminates optically. The optical signal of the wavelength $\lambda_{n-1}$ which is reflected by the CBG 16 is input to the second port P26-2 of the optical circulator 26 and is output from the third port P26-3 thereof. In this manner, the (n−1)-th stage is effective to extract the optical signal of the wavelength $\lambda_{n-1}$ with causing almost no dispersion therein.

As described above, the multiple-wavelength optical demultiplexing filter according to the second embodiment can allow an optical signal of any wavelength which is contained in the input WDM optical signal to be demultiplexed with causing almost no dispersion therein.

Further, the pair of three-port optical circulators (for example, those shown at 21 and 22, 23 and 24, or 25 and 26)

may be replaced by a single four-port optical circulator as shown in FIG. 3.

In addition, the disposition of the long wavelength end and the short wavelength end of the CBG may be reversed in the above- or below-described embodiments.

Third Embodiment

Figure 5:
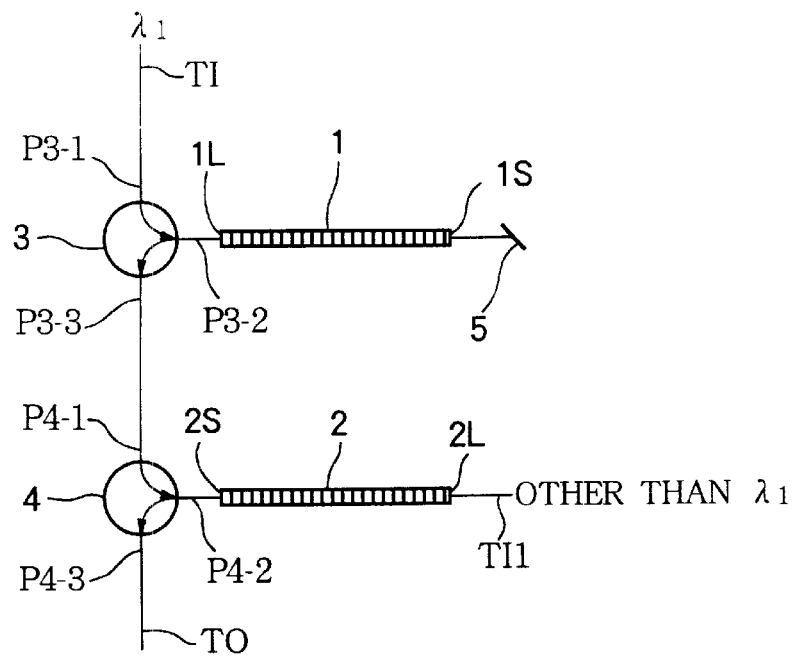
FIG. 5 is a schematic view of an optical multiplexing filter according to a third embodiment of the present invention.

FIG. 5 is a schematic view of an optical multiplexing filter according to a third embodiment of the present invention. As shown in FIG. 5, the optical multiplexing filter according to the third embodiment is generally constructed in the similar manner as the optical demultiplexing filter shown in FIG. 1 except that the optical multiplexing filter according to the third embodiment does not include the termination 6 and the long wavelength end 2L of the CBG 2 is used as an input port $TI_1$.

In the optical multiplexing filter, an optical signal of a wavelength $\lambda_1$ is input via an input port TI to the first port P3-1 of the optical circulator 3, while an optical signal of a wavelength other than $\lambda_1$ is input via the input port $TI_1$ to the long wavelength end 2L of the CBG 2. The optical signal of the wavelength $\lambda_1$ is output from the third port P4-3 of the optical circulator 4 with causing almost no dispersion as mentioned above in connection with the first embodiment. The optical signal of a wavelength other than $\lambda_1$ is input to the second port P4-2 of the optical circulator 4, and is output from the third port P4-3. Accordingly, the third port P4-3 of the optical circulator 4 outputs a multiplexed optical signal including the optical signal of the wavelength $\lambda_1$ and the optical signal of the wavelength other than $\lambda_1$.

In other respects, the third embodiment is similar to the first embodiment.

Fourth Embodiment

Figure 6:
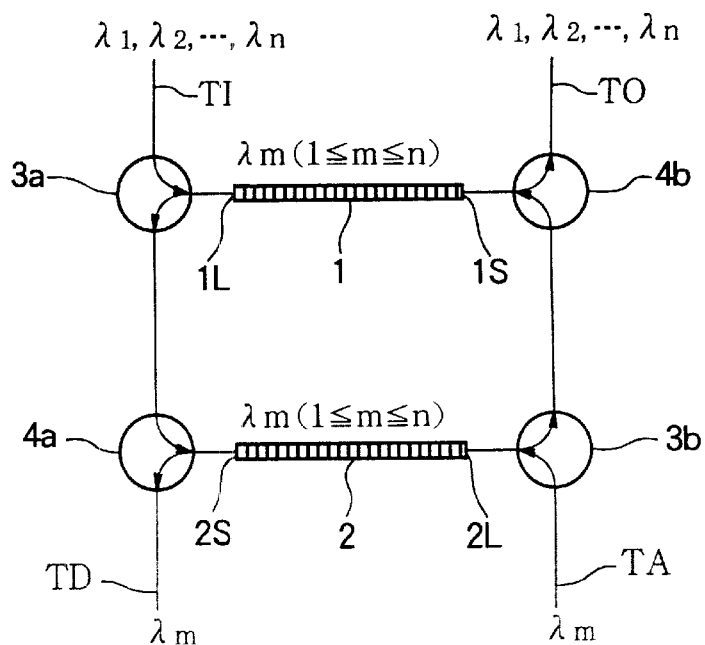
FIG. 6 is a schematic view of an optical add/drop filter according to a fourth embodiment of the present invention.

FIG. 6 is a schematic view of an optical add/drop filter according to a fourth embodiment of the present invention. As shown in FIG. 6, the optical add/drop filter according to the fourth embodiment comprises an input port TI to which a WDM optical signal (wavelengths $\lambda_1, \ldots, \lambda_n$) is input, a drop port TD which outputs only a drop optical signal having a given wavelength $\lambda_m$ among the multiple components of the WDM optical signal, an add port TA to which a second optical signal of the same wavelength $\lambda_m$ as the drop optical signal is input, and an output port TO which outputs a multiplexed signal including the add optical signal and the WDM optical signal without the drop optical signal.

The optical add/drop filter according to the fourth embodiment comprises a CBG 1 and a CBG 2 having substantially the same structure and substantially the same reflection spectrum, and four three-port optical circulators 3a, 4a, 3b, and 4b. The CBG 1 and the CBG 2 are the same as those in the first embodiment, while the optical circulators 3a and 4a or the optical circulators 3b and 4b are the same as the optical circulators 3 and 4 in the first embodiment.

When a WDM optical signal (wavelengths $\lambda_1, \ldots, \lambda_n$) is input to the input port TI of the described arrangement, a drop optical signal of the wavelength $\lambda_m$ is separated from the WDM optical signal and output from the drop port TD, in the similar manner as in the first embodiment. Wavelength components of the WDM optical signal (wavelengths $\lambda_1, \ldots, \lambda_n$ input to the CBG 1 other than the wavelength $\lambda_m$ pass therethrough to be output from the output port TO. The add optical signal having the wavelength $\lambda_m$ which is input to the add port TA is output from the output port TO with causing almost no dispersion therein, in the similar manner as in the first embodiment. In this manner, a WDM optical signal (wavelengths $\lambda_1, \ldots, \lambda_n$) in which an optical signal of the wavelength $\lambda_m$ is replaced (i.e., added and/or dropped) is output from the output port TO.

Thus, the fourth embodiment can allow an optical signal of a particular wavelength to be added and dropped with causing almost no dispersion in the optical signal that is modulated with a high frequency.

The fourth embodiment shows an add/drop filter arrangement in which an optical signal of a single wavelength $\lambda_m$ is either added or dropped. However, by using a cascade connection of a plurality of CBGs having different reflection spectra or by using a CBG having a broad reflection band (broad enough to reflect input signals of two or more wavelengths), it is possible to add and/or drop optical signals having a plurality of wavelengths such as a wavelength $\lambda_m$ and a wavelength $\lambda_{m+1}$, for example. In other respects, the fourth embodiment is similar to the first embodiment.

Fifth Embodiment

Figure 7:
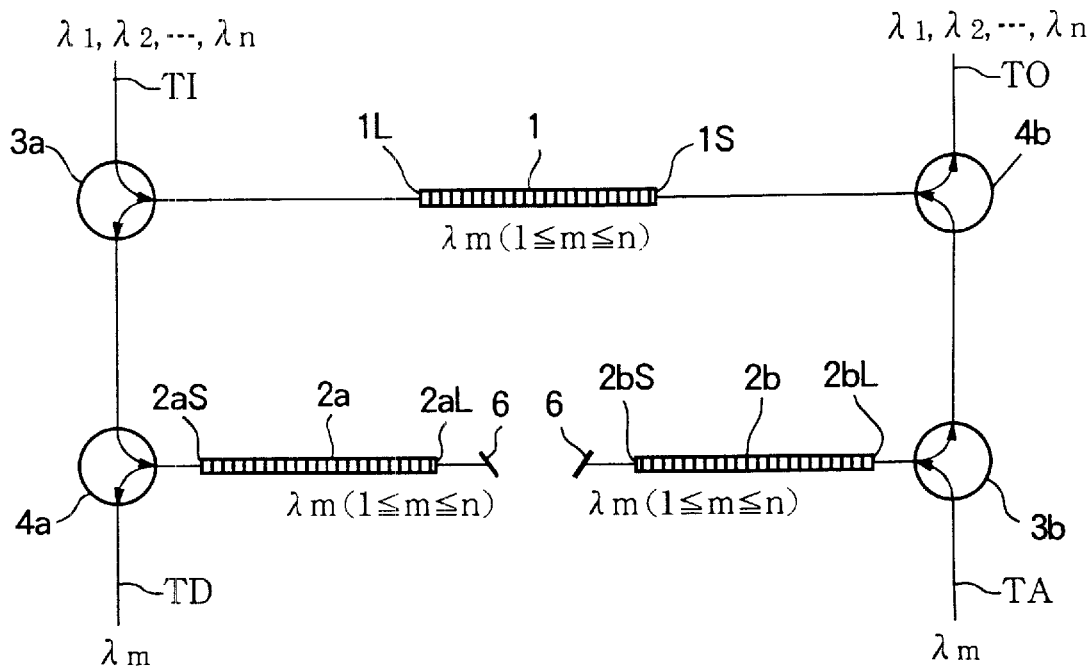
FIG. 7 is a schematic view of an optical add/drop filter according to a fifth embodiment of the present invention.
Figure 8:
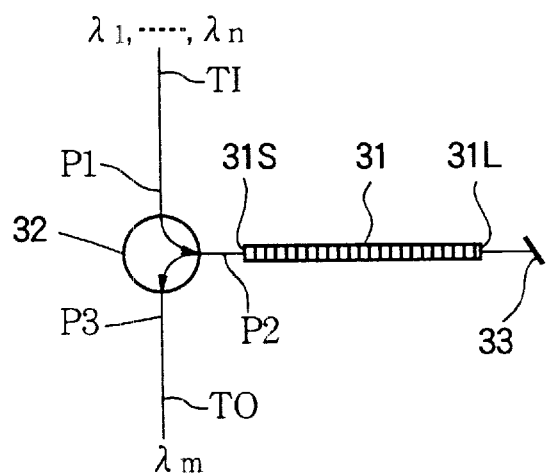
FIG. 8 is a schematic view of a prior-art optical demultiplexing filter.

FIG. 7 is a schematic view of an optical add/drop filter according to a fifth embodiment of the present invention. In the optical add/drop filter according to the fifth embodiment, the CBG 2 of the optical add/drop filter of the fourth embodiment is replaced by a pair of CBG 2a and CBG 2b having substantially the same structure as the CBG 2 and substantially the same reflection spectrum as the CBG 2. The short wavelength end 2aS of the CBG 2a is coupled to the second port of the optical circulator 4a, while the long wavelength end 2aL is coupled to a termination 6. The long wavelength end 2bL of the CBG 2b is coupled to the second port of the optical circulator 3b, while the short wavelength end 2bS of which is coupled to a termination 6.

The optical add/drop filter according to the fifth embodiment performs an add/drop operation in the similar manner as the fourth embodiment, but can avoid undesirable coherent crosstalk that may arise in the CBG 2 of the fourth embodiment.

In other respects, the fifth embodiment is similar to the first embodiment.

As discussed above, the optical filter according to the first to fifth embodiments provides an advantage that an optical signal can be processed while suppressing the occurrence of dispersion in the optical signal.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An optical filter comprising:
   a first chirped Bragg grating including a first input/output end and a second input/output end;
   a second chirped Bragg grating of the same structure as said first chirped Bragg grating, including a third input/output end of the same structure as said first input/output end of said first chirped Bragg grating and a fourth input/output end of the same structure as said second input/output end of said first chirped Bragg grating; and
   a circuit including an input port and an output port, wherein said circuit receives a first optical signal via said input port and brings said first optical signal to said first input/output end of said first chirped Bragg grating, said circuit receives a second optical signal which is produced by reflecting at least one wavelength component of said first optical signal from said first chirped Bragg grating and brings said second optical signal to said fourth input/output end of said second chirped Bragg grating, and said circuit receives a third optical signal which is produced by reflecting said second optical signal from said second chirped Bragg grating and outputs said third optical signal via said output port; and a port coupled to said third input/output end of said second chirped Bragg grating, to which a fourth optical signal is input;

wherein said circuit outputs a multiplexed optical signal including said third optical signal and said fourth optical signal via said output port.

2. The optical filter according to claim 1, wherein said first optical signal is a wavelength division multiplexed optical signal.

3. The optical filter according to claim 1, wherein said circuit comprises a first three-port optical circulator and a second three-port optical circulator;

said first three-port optical circulator including a first port coupled to said input port, a second port coupled to said first input/output end of said first chirped Bragg grating, and a third port from which said second optical signal is output;

said second three-port optical circulator including a fourth port coupled to said third port of said first three-port optical circulator, a fifth port coupled to said fourth input/output end of said second chirped Bragg grating, and a sixth port coupled to said output port.

4. The optical filter according to claim 1, wherein said circuit comprises a four-port optical circulator including a first port coupled to said input port, a second port coupled to said first input/output end of said first chirped Bragg grating, a third port coupled to said fourth input/output end of said second chirped Bragg grating, and a fourth port coupled to said output port.

5. The optical filter according to claim 1, wherein said first input/output end of said first chirped Bragg grating and said third input/output end of said second chirped Bragg grating are long wavelength ends, while said second input/output end of said first chirped Bragg grating and said fourth input/output end of said second chirped Bragg grating are short wavelength ends.

6. The optical filter according to claim 1, wherein said first input/output end of said first chirped Bragg grating and said third input/output end of said second chirped Bragg grating are short wavelength ends, while said second input/output end of said first chirped Bragg grating and said fourth input/output end of said second chirped Bragg grating are long wavelength ends.

7. The optical filter according to claim 1, further comprising another port coupled to said second input/output end of said first chirped Bragg grating, from which wavelength components of said first optical signal that have passed through said first chirped Bragg grating is output.

8. The optical filter according to claim 1, further comprising a termination coupled to said second input/output end of said first chirped Bragg grating, which does not reflect any optical signal.

* * * * *